United States Patent [19]

Irelan et al.

[11] 3,996,729
[45] Dec. 14, 1976

[54] STANDUP OPERATED PORTABLE HAND GRASS TRIMMER

[75] Inventors: Edward A. Irelan, Columbia, Mo.; Larry D. Annis, Elgin, Ill.

[73] Assignee: McGraw-Edison Company, Elgin, Ill.

[22] Filed: Feb. 24, 1975

[21] Appl. No.: 552,327

[52] U.S. Cl. .................................. 56/16.7; 56/17.6
[51] Int. Cl.² ........................................ A01D 35/02
[58] Field of Search ............... 56/16.7, 16.9, 17.1, 56/17.5, 17.6, 3, 12.7, 15.6, 228, DIG. 9; 30/DIG. 5, 231, 194, 341

[56] References Cited

UNITED STATES PATENTS

| 3,759,020 | 7/1972 | Simmons | 56/17.5 |
| 3,807,151 | 1/1973 | Rosenthal et al. | 56/16.9 |

Primary Examiner—Louis G. Mancene
Assistant Examiner—James D. Hamilton
Attorney, Agent, or Firm—Charles F. Lind

[57] ABSTRACT

This invention teaches a dolly device and its separable connection to a normally portable hand-held electric power grass trimmer for converting same for standup operation. The dolly has a base plate with spaced upstanding arms supporting at the upper ends inwardly extended tabs and these tabs fit within recesses in the opposite side walls of the tool housing, and a lock mounted on the dolly base plate can be easily moved against the bias of a spring to fit into a recess in the rear wall of the tool housing.

4 Claims, 4 Drawing Figures

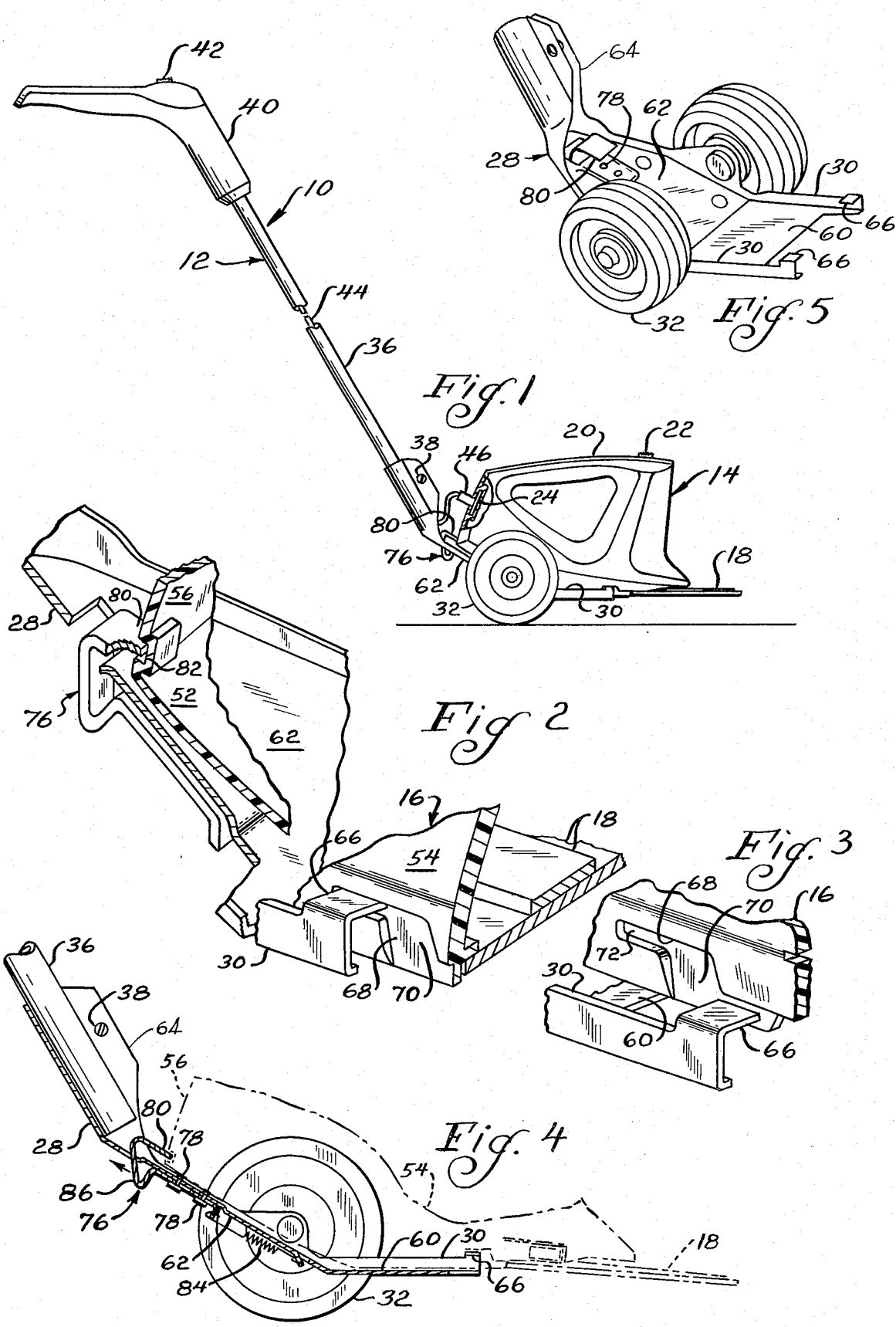

3,996,729

STANDUP OPERATED PORTABLE HAND GRASS TRIMMER

SUMMARY OF THE INVENTION

A battery powered grass trimmer of the type which is hand held has been received with great favor by homeowners for small grass trimming chores as well as by professional gardeners with fortunes in time and material devoted to the horticultural art. This invention makes possible the use of such a device for conversion as a standup operated tool, typically for trimming lawns, and comprises a relatively low-cost dolly construction for support of the tool and an economical easily worked separable connection means for ridgedly holding the tool on the dolly.

BRIEF DESCRIPTION OF THE DRAWINGS

FIG. 1 is a side elevational view of a preferred embodiment of the subject invention showing a dolly operatively connected in place with a portable hand held grass clipper;

FIG. 2 is a broken away perspective view of the pertinent releasable securement portions of the tool and dolly construction shown in FIG. 1;

FIG. 3 is a perspective view, similar in part to FIG. 2, except with the power tool shown separated from the dolly; and FIG. 4 is an elevational sectional view of the dolly shown in FIG. 1.

DETAILED DESCRIPTION OF THE INVENTION

The unit 10 shown in FIG. 1 has a dolly 12 and a portable tool 14 connected to the dolly and carried thereby. The tool 14 itself has a plastic housing 16 within which is located a motor unit and a power train for power operation of a set of cutting blades 18 supported in a cantilevered fashion as is typical in the art from the forward end of the plastic housing. A handle 20 is formed as part of the plastic housing and an on/off switch button 22 is located adjacent the handle for convenient manipulation by the thumb of the user for one-hand operation of the tool. As shown, the tool is of a battery powered type and consequently a battery pack is located in the housing and further an exposed terminal plate 24 used for recharging the device as well as for rendering tool control effective from the handle switch 22 to a dolly control switch, as will be noted hereinafter, is supported by the housing.

The dolly 12 shown has a steel base plate 28 with upturned side flanges 30, and a headed pin is stacked or otherwise secured to each flange and a wheel 32 is journaled on the pin and held thereon by a quick connect self-tap nut. The rearward end of the base plate is curved to embrace a tube 36 and nut and bolt arrangement 38 is used to draw the base plate tightly around the tube for connecting them together. A handle 40 at the upper end of the tube has an on/off switch 42, and the switch is connected by an electrical connector 44 extending through the tube 36 to an end terminal 46 which is adapted to cooperate removably with the proper prongs of the tool terminal plate 24. This connection transfers the tool control from the tool switch 22 to the dolly switch 42 for use of the tool 14 when carried on the dolly.

The subject invention relates to the specific manner of connection between the tool and the dolly and in this regard the details are shown in FIGS. 2, 3, and 4. Initially note that the tool has generally a continuous bottom wall in part parallel to the blades 18 at the front of the tool and in part extended upwardly as at 52 at the rear of the tool, and opposed sidewalls 54 and rear wall 56 upstands from the bottom wall. The previously noted tool terminal plate 24 is held in the rear wall as is evident. The base plate 28 has a flat front portion 60 and a upwardly directed intermediate portion 62, these portions generally underlying the bottom wall of the tool housing. The side flange 30 of the base plate at the forward end of the dolly defines in effect a pair of upstanding arms which are designed to straddle with some clearance the opposed side walls 54 of the tool housing, and tabs 66 are integral with the flanges and extend inwardly toward one another and would normally interfere with the tool positioned therebetween. The housing however has in each side wall an L-shaped recess 68 which includes one leg 70 extended upwardly from the bottom wall in a direction generally normal thereto and a second leg 72 extended at sharp angles rearwardly from the first leg and in a direction generally parallel to the adjacent housing bottom wall and to the cutting blades. The tabs 66 thus fit within the recesses upon first a downward manipulation of the housing toward the dolly and then upon a forward manipulation of the housing relative to the dolly.

The dolly further has provided thereon a locking member 76 which is supported by means of pin and slot connections 78 to the underside of the intermediate part 62 of the base plate. This locking member has an end or key element 80 extended generally parallel to the intermediate portion of the base plate on the upper side thereof and in a direction generally toward the housing when disposed on the base plate, and this key is adapted to fit within a recess 82 in the rear wall of the housing. A spring 84 is connected between the base plate and the locking member 76 tending to move it to a tool secured position where the end key 80 fits within the end recess 82 to hold the housing in place. The locking member further is bent with a finger engaging trigger portion 86 located on the underside of the base plate 28, and this allows easy manual movement of the locking member for locking or releasing the tool housing.

In this regard, it is understood that the housing would be positioned on the dolly in such a manner that the tabs 66 fit within the recess legs 70 and then the housing would be moved forward relative to the dolly so that the tabs slide along within the recess legs 72. The locking member 76 must then be shifted to its tool release position where the key 80 clears the housing and becomes aligned with rear wall recess 82, upon which time the locking member is released and the spring 84 moves the key 80 into the recess to hold the housing relative to the dolly. The actual support of the tool is on the three point suspension comprising the two opposed tabs 66 engaged against the housing on opposed sides thereof and the single locking key 80 fitted within the rear wall recess.

The construction of the dolly is most economical since it is formed merely with a metal stamping and with the ends upturned to provide the locking tabs, the wheel mounts, and the pole mount at the rear wall 64. Similarly, the cooperating side wall recesses and rear wall recess in the housing are particularly suited for use of the dolly as an option since they do not appreciably detract from the pleasing appearance of the tool housing and can be provided universally with all such tools when they are furnished with or without the dolly.

What is claimed is:

1. For converting a portable hand held electric grass clipper for standup operation as a lawn trimmer or the like, the combination with said clipper of a dolly having a base plate, wheels mounted on the base plate, a pole upstanding from the base plate, and a handle on the upper pole end; said clipper having a housing with a generally continuous bottom wall and opposed side walls and a rear wall upstanding therefrom and cutting blades cantilevered forwardly away from the housing in a direction generally parallel to the bottom wall, each of the side walls of the housing having an L-shaped recess including one leg extending upwardly from the housing bottom wall and including another leg angled rearwardly therefrom toward the housing rear wall and further the rear wall of the housing having an open recess; said dolly base plate being shaped to conform generally to the housing bottom wall and having a pair of upstanding arms spaced apart sufficiently to straddle the housing side walls and a locking tab inwardly extended from the upper end of each arm, a locking element and means supporting the locking element relative to the base plate for movement between spaced locking and release positions, the dolly base plate being designed to underlie the clipper housing where the locking tabs fit in the side wall recesses and the locking element fits within the housing rear wall recess to confine the housing on the dolly, where movement of the locking element to the release position is required to allow placement of the housing on the dolly or removal of the housing from the dolly, and means for normally maintaining the locking element in its locking position.

2. The grass clipper-dolly combination according to claim 1, wherein the other legs of the recesses are parallel to each other and to the cutting blades.

3. The grass clipper-dolly combination according to claim 1, wherein said locking element is supported on the side of the base plate opposite the clipper housing and further has an upstanding portion extended through an opening in the base plate that terminates at a key portion on the same side of the base plate as the clipper housing and that fits within the clipper housing rear wall recess.

4. The grass clipper-dolly combination according to claim 3, wherein the locking element further has a shoulder portion on the side of the base plate opposite the clipper housing that serves as a grip surface for manual actuation of the locking element.

* * * * *